United States Patent [19]
Nakata et al.

[11] Patent Number: 5,204,779
[45] Date of Patent: Apr. 20, 1993

[54] ZOOM LENS CAPABLE OF BEING ADJUSTED FOR TRACKING

[75] Inventors: Kazuo Nakata, Tokyo; Shigeru Oshima, Yokohama, both of Japan

[73] Assignee: Canon Kabushiki Kaisha, Tokyo, Japan

[21] Appl. No.: 647,760

[22] Filed: Jan. 30, 1991

[30] Foreign Application Priority Data

Jan. 31, 1990 [JP] Japan ................................. 2-20715

[51] Int. Cl.$^5$ ............................................. G02B 15/14
[52] U.S. Cl. ................................... 359/688; 359/686; 359/676
[58] Field of Search ............... 395/686, 683, 676, 684, 395/693; 359/688, 676, 683

[56] References Cited

U.S. PATENT DOCUMENTS 4,516,839 5/1985 Tokumaru ........................... 359/684
4,712,883 12/1987 Kato et al. ........................... 359/684

FOREIGN PATENT DOCUMENTS 58-1401 1/1983 Japan .
2-210316 8/1990 Japan .

*Primary Examiner*—Bruce Y. Arnold
*Assistant Examiner*—Hung Xuan Dang
*Attorney, Agent, or Firm*—Fitzpatrick, Cella, Harper & Scinto

[57] ABSTRACT

A zoom lens consisting of a front lens portion having a plurality of lens units which are separated from each other by spaces which vary for zooming, and a rear lens portion comprising an image forming relay lens group for introducing rays of light emitted from the front lens portion to an image surface. The rear lens portion consists of a front relay group that is widely spaced ahead of a rear relay group. The rear relay group comprises a first movable lens group having a positive refractive power that moves along the optical axis for macro photography, and a second movable lens group having a positive refractive power that independently moves along the optical axis to adjust tracking.

6 Claims, 6 Drawing Sheets

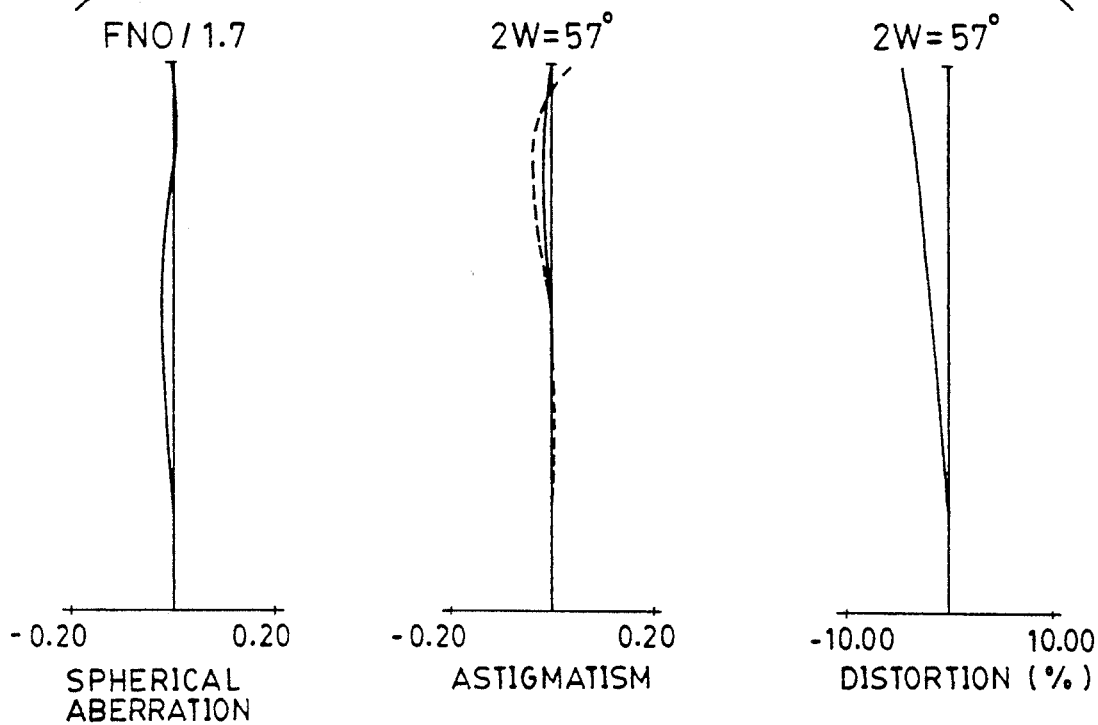
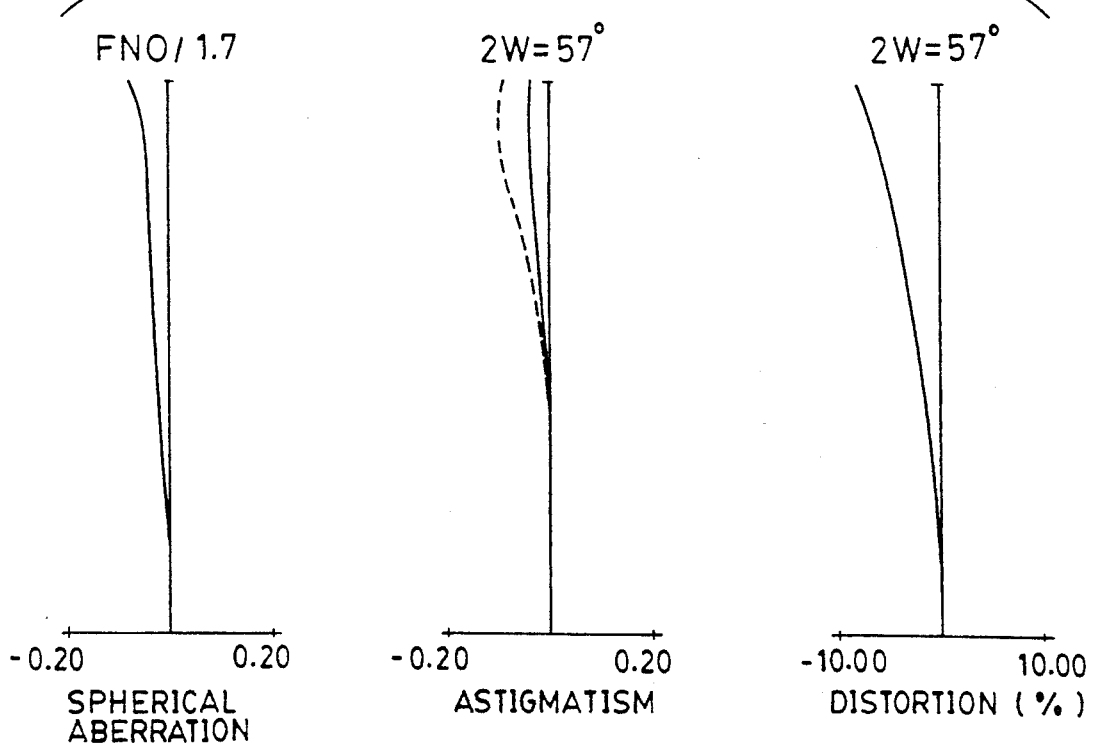

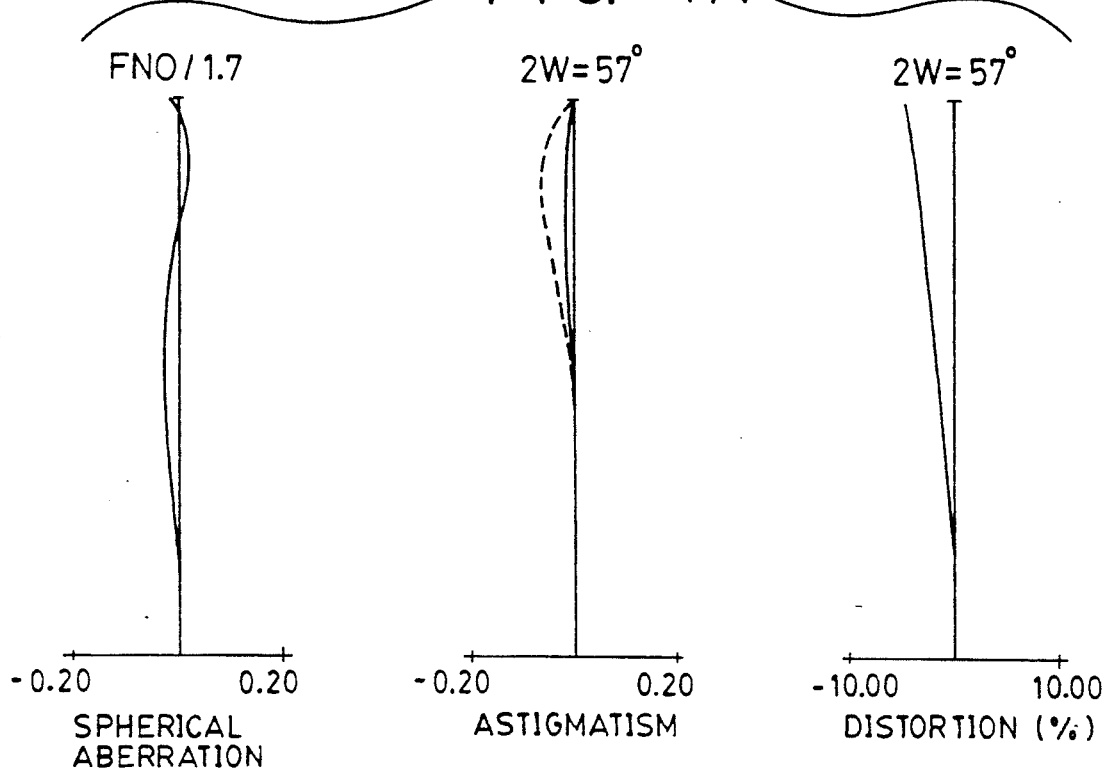
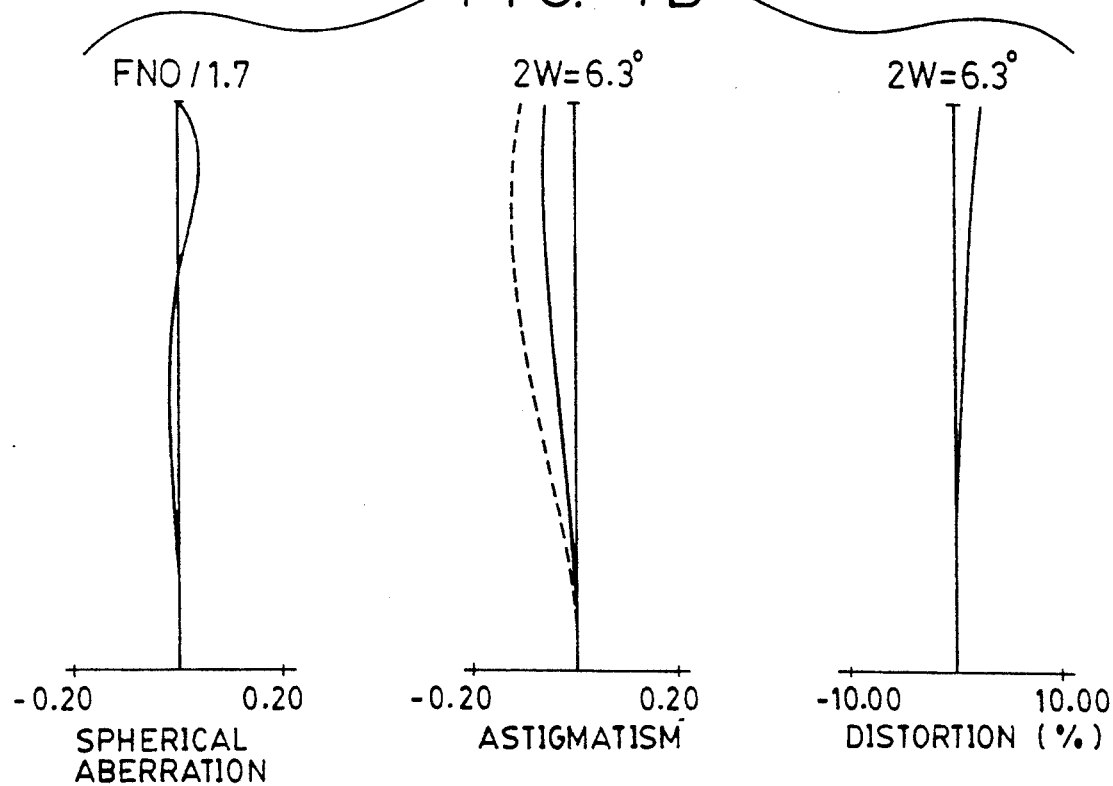

ZOOM LENS CAPABLE OF BEING ADJUSTED FOR TRACKING

BACKGROUND OF THE INVENTION

Field of the Invention

The present invention relates to a zoom lens for a television camera, and more particularly, to a zoom lens, which is capable of macro photography and of being adjusted for tracking.

Description of the Related Art

The technique is known for forming a sharp or vivid image of an object obtained by an interchangeable lens (that can be removed from and mounted on a television camera body) on the image surface of the television camera body, by moving the relay lens group of a zoom lens, i.e., so-called tracking adjustment:

The technique of performing macro photography by moving the relay lens group is also known.

Japanese Patent Publication No. 58-1401, published Jan. 11, 1983, discloses a device for moving the same relay lens group along an optical axis, for both macro photography and tracking adjustment. In this device, when the operation mode is changed over to the normal photographing mode from the macro photographing mode, wherein macro photography is performed by moving the relay lens group, which has the function of forming an image, the relay lens group is returned to the initial tracking position of the normal mode.

However, while the above-described device employs the single relay lens group for macro photography and tracking adjustment, that device also requires a macro photographic mechanism, a tracking adjustment mechanism and a mechanism for interconnecting these two mechanisms.

Hence, the mechanical structure of that device is complicated and the overall size of the device is increased. Furthermore, high precision is required for the above-described mechanism and for the mechanism for returning the lens group for tracking adjustment.

Japanese Patent Application No. 32389/1989 (co-pending U.S. Ser. No. 475,760 filed Feb. 6, 1990) has disclosed a relay lens whose rear relay lens group includes a first movable lens group, which moves along an optical axis for macro photography, and a second movable lens group which moves along the optical axis for tracking adjustment.

SUMMARY OF THE INVENTION

A primary object of the present invention is to provide a small zoom lens, which is capable of performing macro photography on an object located closer to the lens than a normal object distance and of being focused and adjusted for tracking.

A second object of the present invention is to provide a photographic lens, which is improved from the photographic lens disclosed in U.S. Ser. No. 475,760 and which has less changes in aberrations and therefore, exhibits higher optical performance.

These objects are achieved by providing a zoom lens with a front lens portion, comprising lens units movable for zooming, and a rear lens portion, consisting of a front relay group and a rear relay group. The rear relay group further comprises a first movable lens group having a positive refractive power and a second movable lens group having a positive refractive power, wherein a lateral magnification $\beta 1$ of said first movable lens group and a lateral magnification $\beta 2$ of said second movable lens group satisfy the conditions (1) and (2) recited hereafter. The first movable lens group moves along an optical axis for macro photography and the second movable lens group independently moves along the optical axis, for tracking adjustments.

BRIEF DESCRIPTION OF THE DRAWINGS

FIG. 2C shows aberrations obtained when the lens is adjusted for tracking;

FIG. 2D shows aberrations obtained when macro photography is performed;

FIGS. 4A and 4B respectively show aberrations of the lens set at the wideangle and telephoto ends in Numerical Example 2;

DETAILED DESCRIPTION OF THE PREFERRED EMBODIMENTS

Figure 1:
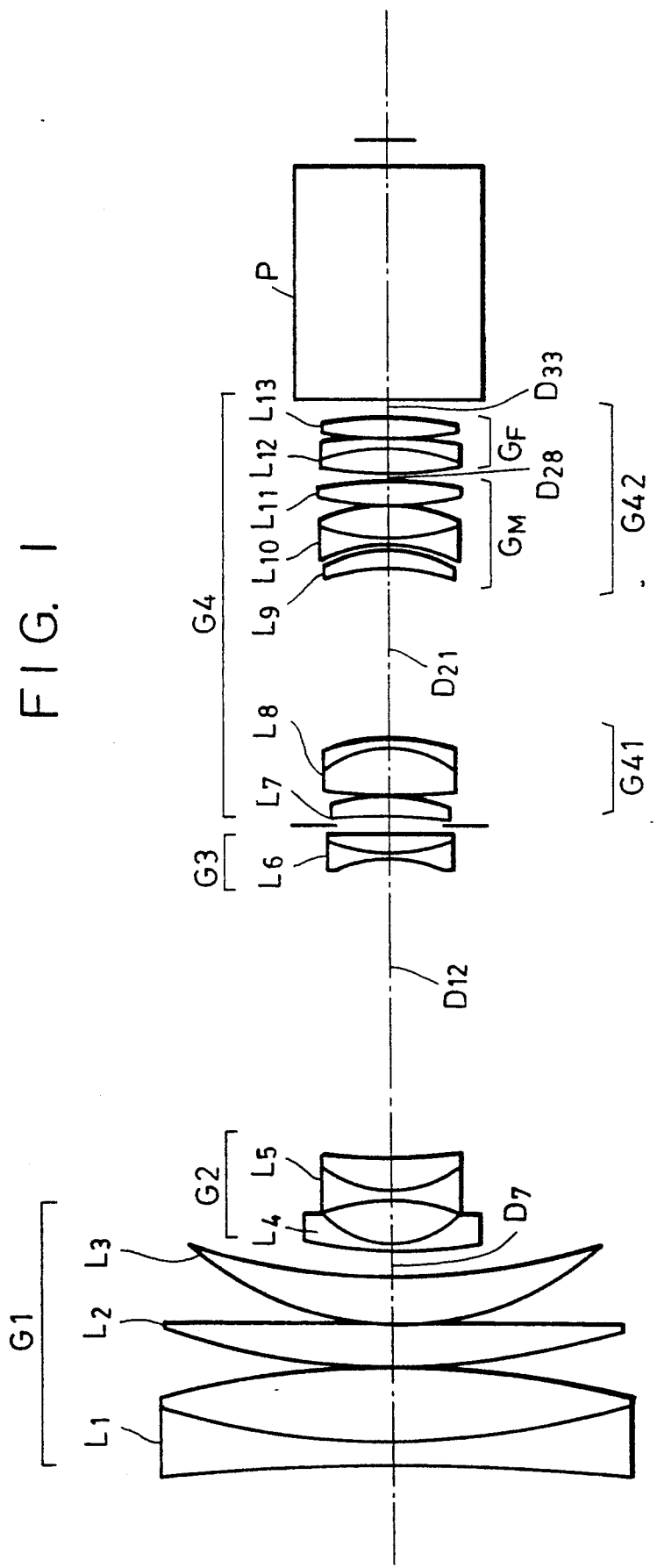
FIG. 1 is a schematic cross-sectional view of the zoom lens arrangement employed in Numerical Example 1 of the present invention.
Figure 3:
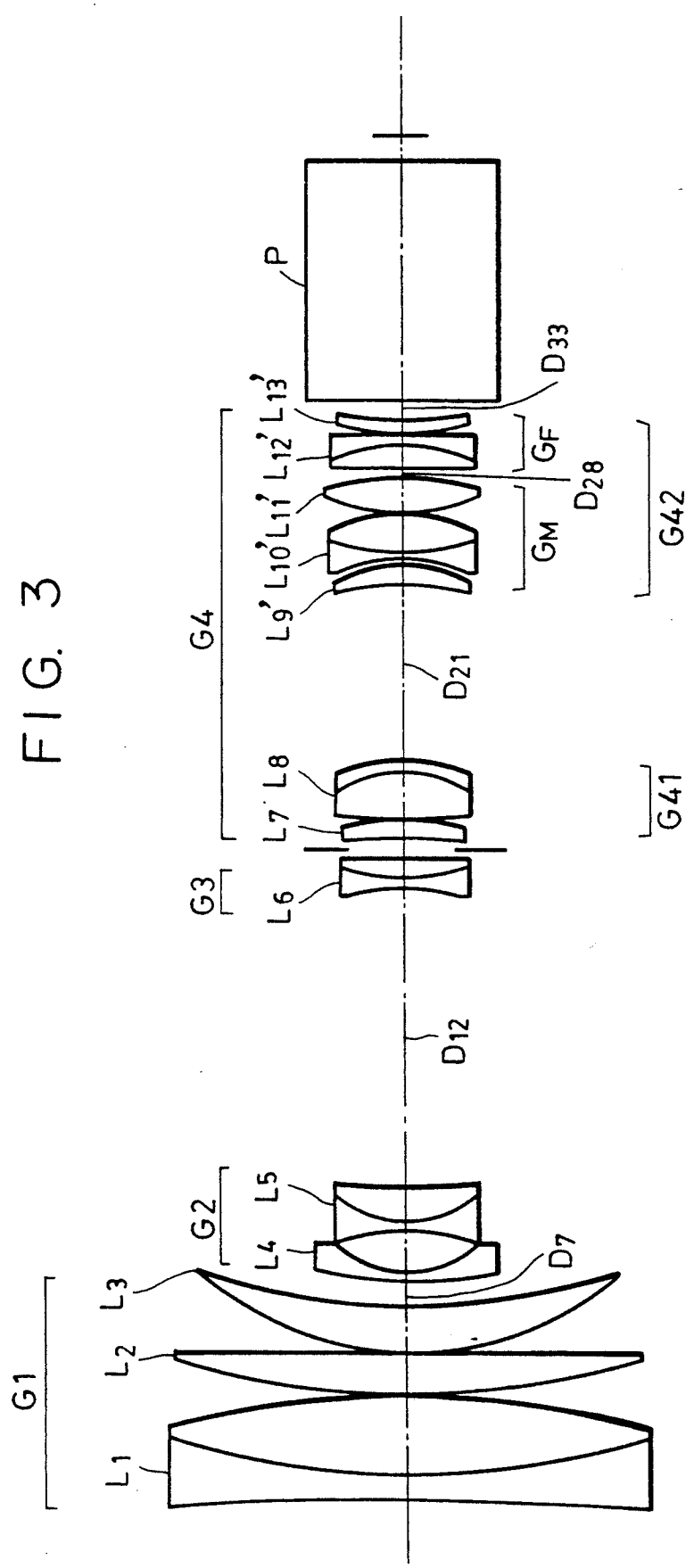
FIG. 3 is a schematic cross-sectional view of the zoom lens arrangement employed in Numerical Example 2 of the present invention.

Photographic zoom lens embodiments shown in FIGS. 1 and 3 each comprise a focusing and magnification-varying front lens portion including a plurality of movable lens groups, and a rear lens portion comprising an image-forming relay lens group that consists of a front relay group and a rear relay group. The rear relay group is separated from the front relay group by an air space that is wider than any other air space in the zoom lens. The front lens portion also is disposed closer to an object than the relay lens group.

The rear relay group comprises a first movable lens group which contains a cemented lens, which has a positive refractive power and which moves along the optical axis for macro photography, and a second movable lens group which contains a cemented lens and a positive lens, which has a positive refractive power and which moves along the optical axis for tracking adjustment. Lateral magnifications $\beta 1$ and $\beta 2$ of the first and second movable lens groups satisfy the following conditions:

$$0.18 \leq (1-\beta 1^2)\beta 2^2 \leq 0.5 \qquad (1)$$

$$0.5 \leq (1-\beta 2^2) \leq 0.82 \qquad (2)$$

The zoom lens according to the present invention will be described in detail with reference to the accompanying drawings. In the zoom lens shown in FIG. 1, a lens group is a focusing lens group, which has a positive refractive power and which is movable along the optical axis for focusing to obtain a sharp image of an object located within a normal object distance. Lens groups $G_2$ and $G_3$ are used for varying magnification. The lens group $G_2$ has a negative refractive power and serves as a variator by moving along the optical axis for zooming. The lens group $G_3$ has a negative refractive power and serves as a compensator for zooming, which compensates for the shift of an image surface. A lens group $G_4$ is a relay lens group which has the function of forming an image. The lens group $G_4$ includes a front relay group $G_{41}$ disposed closer to the object and a rear relay group $G_{42}$ separated from the front relay group $G_{41}$ by the widest air space within the zoom lens. The wide air space between the lens groups $G_{41}$ and $G_{42}$ can be used to accommodate an optical member such as an extender therein. In this embodiment, both the front and rear relay groups $G_{41}$ and $G_{42}$ have a positive refractive power. In FIG. 1, a reference symbol P denotes an equivalent of a color separation prism, for the image surface of a television camera body, and this lens group may consist of a single lens.

The rear relay group $G_{42}$ of the relay lens group $G_4$ includes a first movable lens group $G_M$, which has a positive refractive power and which moves along the optical axis for macro photography of an object located at a position closer to the camera than the normal object distance, and a second movable lens group $G_F$, which has a positive refractive power and which moves along the optical axis for tracking adjustment.

The first and second movable lens groups $G_M$ and $G_F$ move independently from each other along cam grooves respectively provided in separate lens barrels (not shown) for macro photography and tracking adjustment.

Since the lens groups move independently from each other for macro photography and tracking adjustment, as stated above, a conventionally required interconnecting mechanism is not necessary, and the overall structure is not made complicated.

To reduce the overall size of the zoom lens and at the same time reduce changes in aberrations, and thereby accomplish high optical performance, even when the relay lens group contains two movable lens groups, and to ensure high controllability during the movement of the first and second movable lenses, the second movable lens group contains a cemented lens and a positive lens, while satisfying the conditions (1) and (2).

To eliminate collision of the two lens groups caused by movements thereof for macro photography and tracking adjustment, a provision of dead space within which such movement may take place is required. However, while movement of the lens groups through a long distance increases the overall size of the optical system, it moderates the need for high level of mechanical accuracy in the mechanisms. Movement of the lens groups through a short distance requires a high level of accuracy for the mechanisms although it reduces the overall size of the optical system. Setting of an appropriate and reasonable movement of the movable lens groups is, therefore, an essential design problem.

The conditions (1) and (2) based on the lateral magnifications $\beta 1$ and $\beta 2$ are associated with the movement of the image surface caused by the movement of the first and second movable lens groups. As stated above, when the movement of the movable lens groups is small, the dead space can be reduced, thereby reducing the size of the optical system. However, a high level of accuracy for the mechanisms is required. Conversely, when the movement of the movable lens groups is large, the dead space is increased, thereby increasing the size of the optical system. However, the mechanical accuracy for the mechanisms is moderated.

In order to make the movement of the lens groups sufficiently small, the ratio of the movement of the image surface to the movement of the lens group must be 0.18 or above. To ensure a moderate level of accuracy for the mechanisms, the ratio of the shift of the image surface to the movement of the lens group should be 0.82 or less.

Since the first movable lens group $G_M$ having a positive refractive power, is moved for macro photography to return the image point of an object located close to the lens, (which would otherwise move away from the optical system,) to the position of the image surface, the lens group $G_M$ is moved only toward the object. However, tracking adjustment is performed by moving the lens groups in both directions whereby the image point is moved toward the object and also is moved away from the object. The second movable lens group $G_F$ is thus moved similarly in both directions. Since there is a wide space on the side of the first movable lens group between the front relay group $G_{41}$ and the first movable lens group $G_M$, movement of the first movable lens group through a long distance does not increase the size of the optical system. However, it is necessary for a space to be provided beforehand between the first and second movable lens groups in order to eliminate collision of the second movable lens group $G_F$ against the first movable lens group $G_M$, which may be caused during the movement of the second movable lens group toward the object. This creates a dead space and hence increases the size of the optical system. Therefore, movement of the second movable lens group $G_F$ is preferably reduced as much as possible within a range, which ensures the mechanical accuracy of the mechanisms, and the movement of the first movable lens group $G_M$ is preferably increased to an extent which ensures moderation of the need for high mechanical accuracy.

To ensure the above-described movement of the first movable lens group $G_M$ is through a relatively long distance, the ratio of the shift of the image surface to the movement of the lens group is made 0.5 or less, as shown in Condition (1).

To ensure the above-described movement of the second movable lens group $G_F$ is through a relatively short distance, the ratio of the shift of the image surface to the movement of the lens group is made 0.5 or above, as shown in Condition (2).

At least one cemented lens is contained in both the first and second movable lens groups, $G_M$ and $G_F$, to achieve good correction of variations in various aberrations, and particularly those spherical and chromatic aberrations, which would occur when the movable lens groups are moved for macro photography and moved for tracking adjustment.

Since the marginal rays of on-axial light between the front and rear relay groups, G41 and G42, are generally either slightly divergent or convergent and hence substantially afocal, variations in the distance of incidence caused by the movement of the entirety of the rear relay group are small, and variations in aberration can therefore be maintained small. However, when the two parts of the rear relay group are to be moved separately, spherical and chromatic aberrations must be corrected in each part. Hence, the rear relay lens group is arranged in the manner described below to correct the spherical and chromatic aberrations in the second movable lens group. That is, since variations in the aberration caused by the movement of the entirety of the rear relay group are small, when the spherical and chromatic aberrations are corrected in the second movable lens group, variations in the aberration caused by the movement of the first movable lens group can also be compensated for.

Firstly, the cemented lens in the second movable lens group $G_M$ has a concave cemented surface on the side thereof closer to the object. The cemented lens also has a negative refractive power. The difference $\Delta n$ in the refractive index between the two glass materials satisfies the following condition:

$$.15 \leq \Delta n \tag{3}$$

Secondly, the shape parameter X of the positive lens in the second movable lens group satisfies the following condition:

$$0 \leq X \leq 3 \tag{4}$$

Wherein the shape parameter X is given by $$X = \frac{r2 + r1}{r2 - r1}$$

where r1 is the radius of curvature of the surface located close to the object, and r2 is the radius of curvature of the surface located close to the image.

When condition (3) is satisfied, i.e., the cemented lens in the second movable lens group $G_M$ has a concave cemented surface on the side thereof closer to the object, the cemented lens has a negative refractive power, and the difference $\Delta n$ in the refractive index between the two glass materials satisfies $0.15 \leq \Delta n$. Further, an over spherical aberration is generated on the cemented surface of the cemented lens in the second movable lens group so as to correct spherical aberration in the entire movable lens.

When the shape parameter X of the last positive lens in the second movable lens group $G_F$ satisfies $0 \leq X \leq 3$, refraction of the light can be performed uniformly at the surfaces r1 and r2. This will suppress generation of under spherical aberration, and thus enables correction of spherical aberration of the entire movable lens.

Furthermore, to correct the chromatic aberration of the second movable lens group, it is desirable that the difference in Abbe's number between the positive and negative lenses which constitute the cemented lens be set to 10 or above. When the difference in Abbe's number between the positive lenses in the second movable lens group $G_F$ is 60 or above, correction of the chromatic aberration is further facilitated.

Next, Numerical Examples of the present invention will be shown. In these Examples, a reference symbol Ri denotes a radius of curvature of the surface of an ith lens, starting first with the lens disposed closest to the object, a reference numeral Di denotes the thickness and the air space of the ith lens, and reference numerals Ni and $\nu$i respectively designate the refractive index and Abbe's number of the glass of the ith lens.

The symbols l1 to l13 respectively denote lens elements. The arrangements of the lens elements in Numerical Examples 1 and 2 respectively correspond to those embodiments shown in FIGS. 1 and 3. As shown by a comparison of Numerical Examples 1 and 2, the differences therebetween are in the elements comprising the first and second movable lens groups, $G_M$ and $G_F$. Therefore, in Numerical Example 2 and in FIG. 3, the elements $L_9$–$L_{13}$ are shown with a prime.

| Numerical Example 1 |
| F = 10.4    FNO = 1:1.7    2ω = 55.7° |

| | | | | | | | |
|---|---|---|---|---|---|---|---|
| R1 = | −696.661 | D1 = | 5.29 | N1 = | 1.81265 | ν1 = | 25.4 | L₁ |
| R2 = | 172.951 | D2 = | 15.58 | N2 = | 1.60548 | ν2 = | 60.7 | |
| R3 = | −193.102 | D3 = | 0.23 | | | | | |
| R4 = | 154.848 | D4 = | 8.76 | N3 = | 1.60548 | ν3 = | 60.7 | L₂ |
| R5 = | ∞ | D5 = | 0.23 | | | | | |
| R6 = | 66.583 | D6 = | 9.89 | N4 = | 1.60548 | ν4 = | 60.7 | L₃ |
| R7 = | 141.636 | D7 = | variable | | | | | |
| R8 = | 87.651 | D8 = | 2.02 | N5 = | 1.71615 | ν5 = | 53.8 | L₄ |
| R9 = | 22.618 | D9 = | 8.99 | | | | | |
| R10 = | −34.228 | D10 = | 2.02 | N6 = | 1.71615 | ν6 = | 53.8 | L₅ |
| R11 = | 25.905 | D11 = | 7.01 | N7 = | 1.81265 | ν7 = | 25.4 | |
| R12 = | 283.385 | D12 = | variable | | | | | |
| R13 = | −33.968 | D13 = | 1.55 | N8 = | 1.76651 | ν8 = | 40.1 | L₆ |
| R14 = | 43.779 | D14 = | 3.83 | N9 = | 1.81265 | ν9 = | 25.4 | |
| R15 = | ∞ | D15 = | variable | | | | | |
| R16 = | (stop) | D16 = | 2.00 | | | | | |
| R17 = | −203.141 | D17 = | 4.38 | N10 = | 1.62286 | ν10 = | 60.3 | L₇ |
| R18 = | −38.467 | D18 = | 0.16 | | | | | |
| R19 = | 180.909 | D19 = | 10.24 | N11 = | 1.53430 | ν11 = | 48.9 | L₈ |
| R20 = | −21.532 | D20 = | 1.50 | N12 = | 1.79012 | ν12 = | 44.2 | |
| R21 = | −40.370 | *D21 = | variable 37.00 | | | | | |
| R22 = | −48.653 | D22 = | 4.29 | N13 = | 1.52555 | ν13 = | 50.8 | L₉ |
| R23 = | −26.499 | D23 = | 0.87 | | | | | |
| R24 = | −30.377 | D24 = | 1.40 | N14 = | 1.81077 | ν14 = | 40.9 | L₁₀ |
| R25 = | 61.922 | D25 = | 6.98 | N15 = | 1.51825 | ν15 = | 64.1 | |
| R26 = | −36.370 | D26 = | 0.15 | | | | | |
| R27 = | 70.337 | D27 = | 5.38 | N16 = | 1.48915 | ν16 = | 70.2 | L₁₁ |
| R28 = | −71.648 | *D28 = | variable 1.50 | | | | | |
| R29 = | 91.749 | D29 = | 5.30 | N17 = | 1.48915 | ν17 = | 70.2 | L₁₂ |
| R30 = | −44.345 | D30 = | 2.00 | N18 = | 1.88814 | ν18 = | 40.8 | |
| R31 = | −126.206 | D31 = | 0.15 | | | | | |
| R32 = | 110.577 | D32 = | 3.76 | N19 = | 1.51825 | ν19 = | 64.1 | L₁₃ |
| R33 = | −110.577 | *D33 = | variable 4.00 | | | | | |
| R34 = | ∞ | D34 = | 50.00 | N20 = | 1.51825 | ν20 = | 64.1 | P |
| R35 = | ∞ | | | | | | | |

*D21 varies during macro photography
D33 varies during tracking adjustment
D28 varies during macro photography and tracking adjustment -continued Focal Length
| Variable Space | 10.40 | 99.86 |
| --- | --- | --- |
| D7 | 1.49 | 58.22 |
| D12 | 62.69 | 6.69 |
| D15 | 2.15 | 1.42 |

Difference in refractive index in $L_{12}$
$\Delta n = 0.39899$
Shape parameter of $L_{13}$
$X = 0$
Lateral magnifications of $G_M$ and $G_F$
$\beta_1 = 0.05069$
$\beta_2 = 0.70455$
$(1 - \beta_1^2) \beta_{22} = 0.49512$
$(1 - \beta_{22}) = 0.50361$ Numerical Example 2
F = 10.4    FNO = 1:1.7    $2\omega$ = 55.7°

| | | | | | | | |
| --- | --- | --- | --- | --- | --- | --- | --- |
| R1 = | −696.661 | D1 = | 5.29 | N1 = | 1.81265 | $\nu 1$ = | 25.4 | $L_1$
| R2 = | 172.951 | D2 = | 15.58 | N2 = | 1.60548 | $\nu 2$ = | 60.7 |
| R3 = | −193.102 | D3 = | 0.23 | | | | |
| R4 = | 154.848 | D4 = | 8.76 | N3 = | 1.60548 | $\nu 3$ = | 60.7 | $L_2$
| R5 = | ∞ | D5 = | 0.23 | | | | |
| R6 = | 66.583 | D6 = | 9.89 | N4 = | 1.60548 | $\nu 4$ = | 60.7 | $L_3$
| R7 = | 141.636 | D7 = | variable | | | | |
| R8 = | 87.651 | D8 = | 2.02 | N5 = | 1.71615 | $\nu 5$ = | 53.8 | $L_4$
| R9 = | 22.618 | D9 = | 8.99 | | | | |
| R10 = | −34.228 | D10 = | 2.02 | N6 = | 1.71615 | $\nu 6$ = | 53.8 | $L_5$
| R11 = | 25.905 | D11 = | 7.01 | N7 = | 1.81265 | $\nu 7$ = | 25.4 |
| R12 = | 283.385 | D12 = | variable | | | | |
| R13 = | −33.968 | D13 = | 1.55 | N8 = | 1.76651 | $\nu 8$ = | 40.1 | $L_6$
| R14 = | 43.779 | D14 = | 3.83 | N9 = | 1.81265 | $\nu 9$ = | 25.4 |
| R15 = | ∞ | D15 = | variable | | | | |
| R16 = | (stop) | D16 = | 2.00 | | | | |
| R17 = | −203.141 | D17 = | 4.38 | N10 = | 1.62286 | $\nu 10$ = | 60.3 | $L_7$
| R18 = | −38.467 | D18 = | 0.16 | | | | |
| R19 = | 180.909 | D19 = | 10.24 | N11 = | 1.53430 | $\nu 11$ = | 48.9 | $L_8$
| R20 = | −21.532 | D20 = | 1.50 | N12 = | 1.79012 | $\nu 12$ = | 44.2 |
| R21 = | −40.370 | *D21 = | variable 37.00 | | | | |
| R22 = | −55.059 | D22 = | 4.73 | N13 = | 1.51678 | $\nu 13$ = | 54.7 | $L_9'$
| R23 = | −25.173 | D23 = | 0.82 | | | | |
| R24 = | −28.576 | D24 = | 1.40 | N14 = | 1.88814 | $\nu 14$ = | 40.8 | $L_{10}'$
| R25 = | 45.797 | D25 = | 8.48 | N15 = | 1.51313 | $\nu 15$ = | 60.5 |
| R26 = | −29.495 | D26 = | 0.15 | | | | |
| R27 = | 43.390 | D27 = | 7.24 | N16 = | 1.48915 | $\nu 16$ = | 70.2 | $L_{11}'$
| R28 = | −56.455 | *D28 = | variable 1.50 | | | | |
| R29 = | 338.133 | D29 = | 5.21 | N17 = | 1.62286 | $\nu 17$ = | 60.3 | $L_{12}'$
| R30 = | −36.877 | D30 = | 2.00 | N18 = | 1.77621 | $\nu 18$ = | 49.6 |
| R31 = | −226.631 | D31 = | 0.15 | | | | |
| R32 = | 50.580 | D32 = | 2.92 | N19 = | 1.51825 | $\nu 19$ = | 64.1 | $L_{13}'$
| R33 = | 101.160 | *D33 = | variable 4.00 | | | | |
| R34 = | ∞ | D34 = | 50.00 | N20 = | 1.51825 | $\nu 20$ = | 64.1 | P
| R35 = | ∞ | | | | | | |

*D21 varies during macro photography
D33 varies during tracking adjustment
D28 varies during macro photography and tracking adjustment Focal Length
| Variable Space | 10.40 | 99.86 |
| --- | --- | --- |
| D7 | 1.49 | 58.22 |
| D12 | 62.69 | 6.69 |
| D15 | 2.15 | 1.42 |

Difference in refractive index in $L_{12}$
$\Delta n = 0.15335$
Shape parameter of $L_{13}$
$X = 3$
Lateral magnifications of $G_M$ and $G_F$
$\beta_1 = 0.08333$
$\beta_2 = 0.42855$
$(1 - \beta_1^2) \beta_{22} = 0.18238$
$(1 - \beta_{22}) = 0.81635$ In Numerical Example 1, the first movable lens group $G_M$ was set at the wideangle end of zooming and moved by −5.31 mm for macro photography when the object distance from the surface of the first lens was 50 mm. When the second movable lens group was moved by −0.7 mm during the tracking adjustment, the movement of the image surface was −0.57 mm.

Figure 2A:
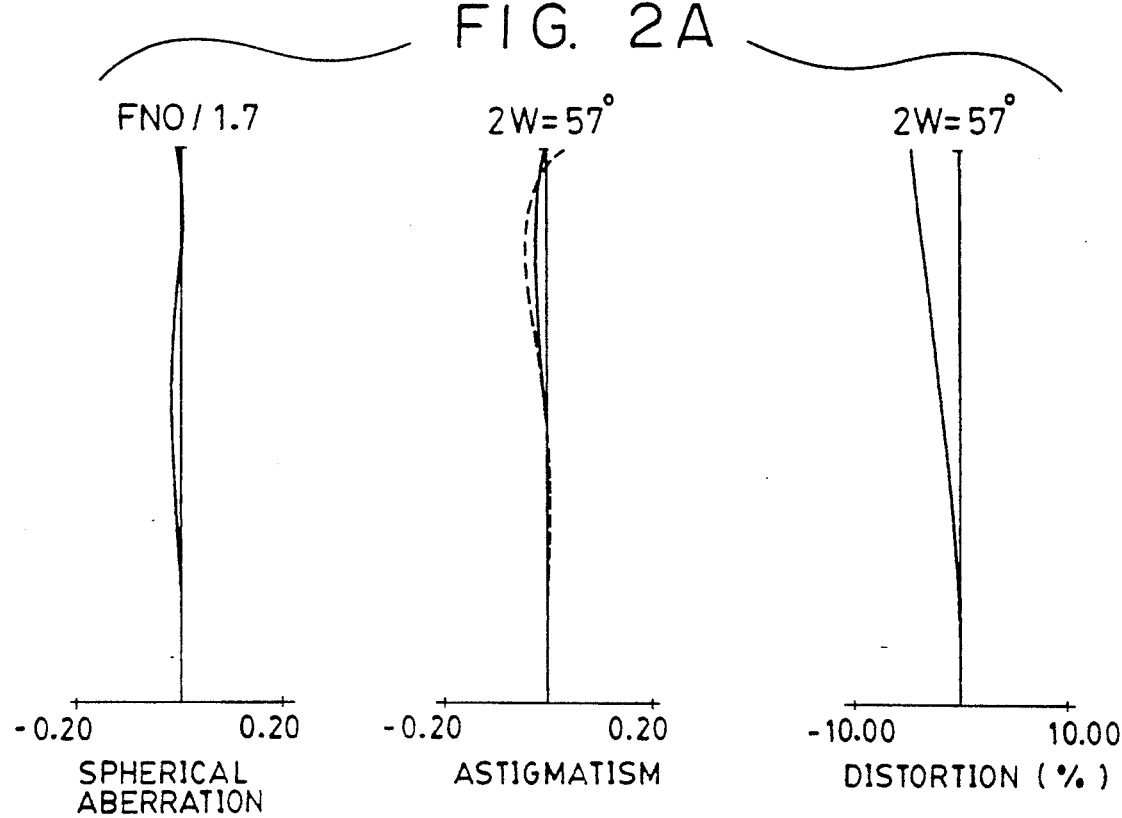
FIGS. 2A and 2B respectively show aberrations of the lens set at the wideangle and telephoto ends in Numerical Example 1.
Figure 2B:
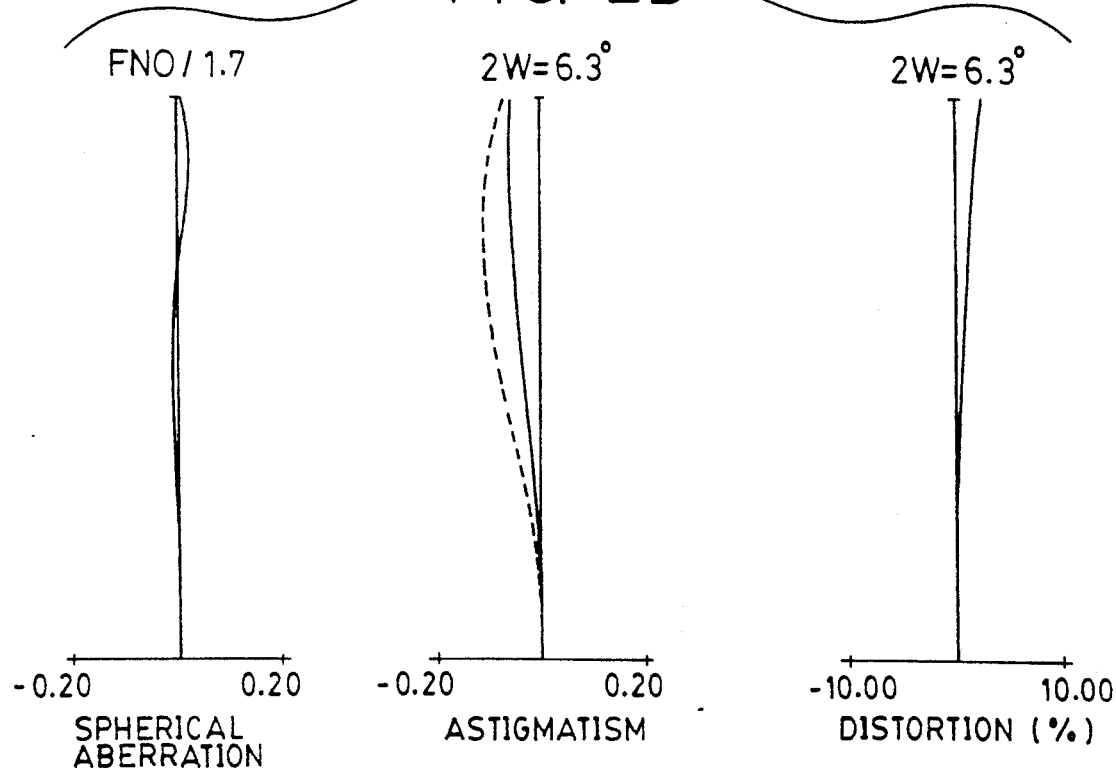

FIGS. 2 (A) and (B) respectively show the aberration curves obtained when the object distance from the lens also shown in FIG. 1 is set at infinity at the wideangle and telephoto ends. FIG. 2 (C) shows the aberration curve obtained when tracking adjustment is performed by moving the second movable lens by −0.7 mm relative to the object located at an infinite distance from the lens set at the wideangle end. FIG. 2 (D) shows the aberration curve obtained when macro photography is performed by moving the first movable lens group by −5.31 mm in a case when the object distance from the first lens set at the wideangle end is 50 mm.

In Numerical Example 1, the difference $\Delta n$ in the refractive index was 0.39899, the shape parameter X was 0, $(1-\beta1^2)$ $\beta2^2$ was 0.18238 and $(1-\beta2^2)$ was 0.81635.

As shown in FIGS. 2 (A) and (B), the various aberrations of the lens set at the wideangle and telephoto ends are small. Comparing the aberration curve shown in FIG. 2 (A) with that shown in FIG. 2 (C) obtained when tracking adjustment is performed, variations in the aberration caused by tracking adjustment are very small. Comparing the aberration curve shown in FIG. 2 (A) and that shown in FIG. 2 (D) obtained when macro photography is performed, variations in the aberration caused by macro photography are small. In Numerical Example 1, the movements of the movable lens groups during the macro photography and tracking adjustment are set to values which moderate the level of accuracy for the mechanisms and which ensure reduction in the dead space. Furthermore, variations in the various aberrations caused by macro photography and tracking adjustment are maintained small.

In Numerical Example 2, the first movable lens group $G_M$ was set at the wideangle end of zooming and moved by −1.93 mm for macro photography when the object distance from the surface of the first lens was 50 mm. When the second movable lens group was moved by +0.7 mm during the tracking adjustment, the movement of the image surface was +0.35 mm.

Figure 4C:
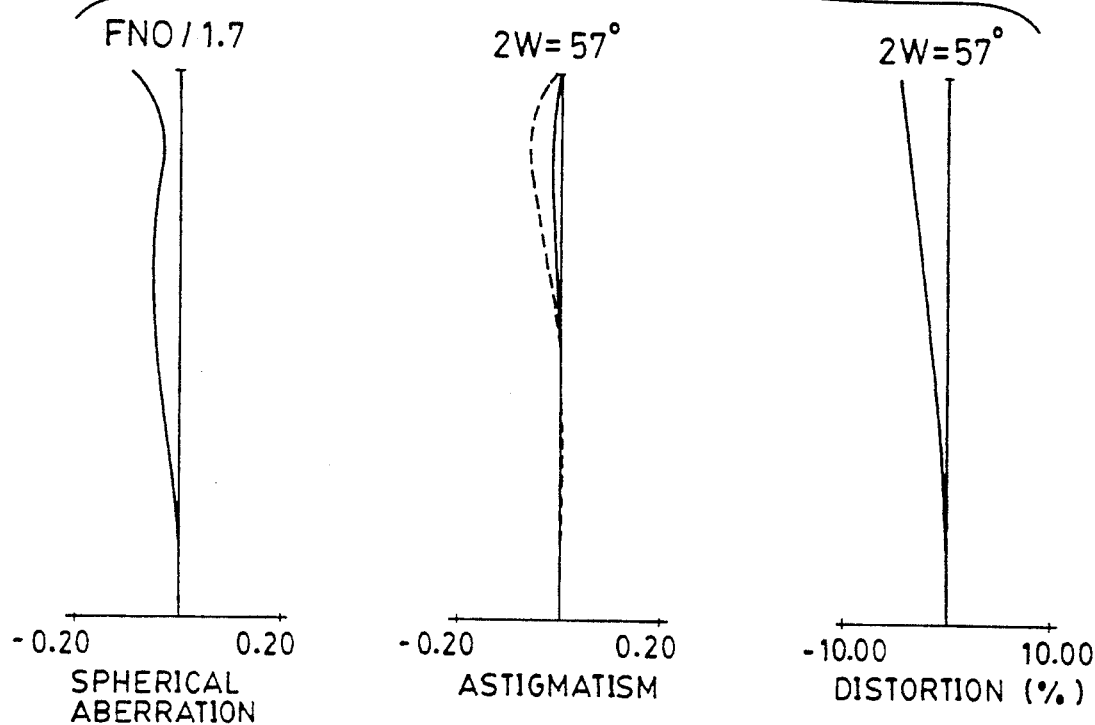
FIG. 4C shows aberrations obtained when the lens is adjusted for tracking.
Figure 4D:
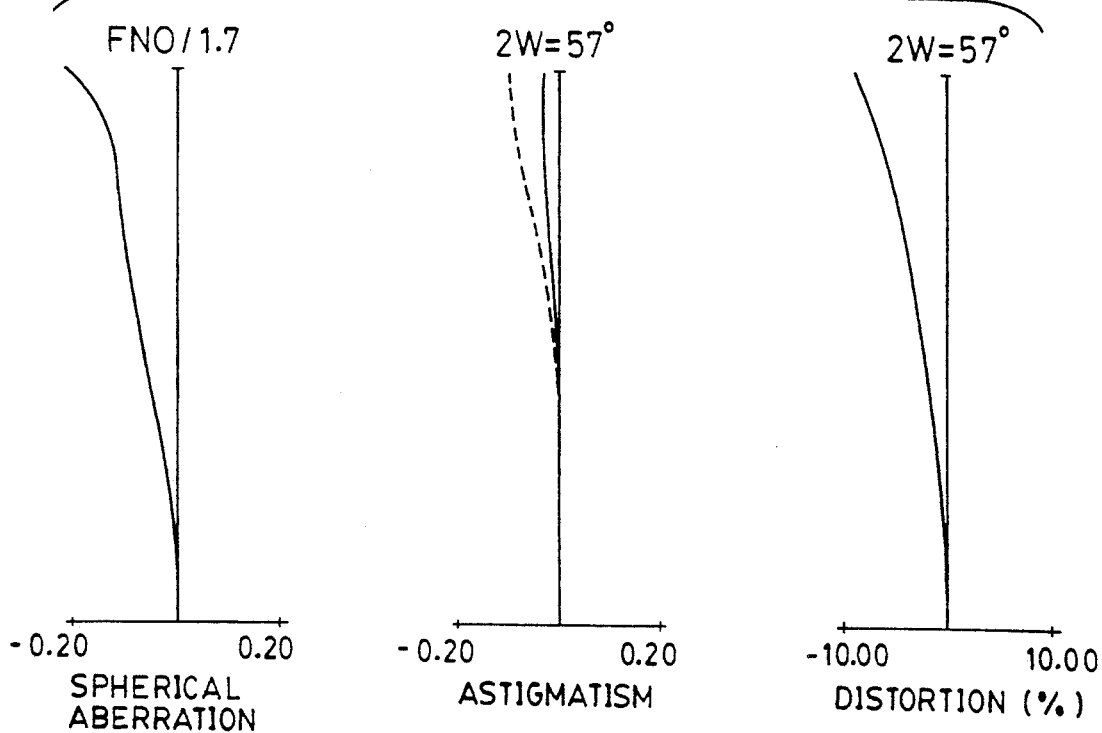
FIG. 4D shows aberrations obtained when macro photography is performed.

FIGS. 4 (A) and (B) respectively show the aberration curves obtained when the object distance from the lens also shown in FIG. 3, is set at infinity at the wideangle and telephoto ends. FIG. 4 (C) shows the aberration curve obtained when tracking adjustment is performed by moving the second movable lens by +0.7 mm relative to the object located at an infinite distance from the lens set at the wideangle end. FIG. 4 (D) shows the aberration curve obtained when macro photography is performed by moving the first movable lens group by −1.93 mm in a case when the object distance from the first lens set at the wideangle end is 50 mm.

In Numerical Example 2, the difference $\Delta n$ in the refractive index was 0.15335, the shape parameter X was 3, $(1-\beta1^2)$ $\beta2^2$ was 0.49512, and $(1-\beta2^2)$ was 0.50361.

As shown in FIGS. 4 (A) and (B), the various aberrations of the lens set at the wideangle and telephoto ends are small. Comparing the aberration curve shown in FIG. 4 (A) with that shown in FIG. 4 (C), obtained when tracking adjustment is performed, variations in the aberration caused by tracking adjustment are very small. Comparing the aberration curve shown in FIG. 4 (A) with that shown in FIG. 4 (D) obtained when macro photography is performed, variations in the aberration caused by macro photography are small. In Numerical Example 2, the movements of the movable lens groups during the macro photography and tracking adjustment are set to values which moderate the level of accuracy for the mechanisms and which ensure reduction in the dead space. Furthermore, variations in the various aberrations caused by macro photography and tracking adjustment are maintained small.

As will be understood from the foregoing description, the rear relay lens group includes the first movable lens group which moves along the optical axis for macro photography and the second movable lens group which moves along the optical axis for tracking adjustment. Preferably, the first movable lens group contains a cemented lens and has a positive refractive power, while the second movable lens group $G_F$ contains a cemented lens, positive lens and has a positive refractive power. Lateral magnifications $\beta1$ and $\beta2$ of the first and second movable lens groups fulfill the conditions expressed by $0.18 \leq (1-\beta1^2)$ $\beta2^2 \leq 0.5$ and $0.5 \leq (1-\beta2^2) \leq 0.82$. It is therefore possible to obtain excellent optical performance, to reduce the movement of the second movable lens group $G_F$ while ensuring a moderate level of needed accuracy for the mechanisms, and to increase the movement of the first movable lens group $G_M$ to an extent which ensures moderation of the need for high mechanical accuracy.

Furthermore, the cemented lens in the second movable lens group $G_F$ has a concave cemented surface on the side thereof close to the object. The cemented lens has a negative refractive power. The difference $\Delta n$ in the refractive index between the two glass materials satisfies the condition expressed by $0.15 \leq \Delta n$. Consequently, over spherical aberration is generated on the cemented surface in order to correct the spherical aberration in the entire second movable lens group. Thereby, variations in the aberrations caused during the tracking adjustment and macro photography are reduced.

Furthermore, the shape parameter X of the last positive lens in the second movable lens group Gr satisfies the condition expressed by $0 \leq X \leq 3$. Consequently, refraction of the light can be performed uniformly on the surfaces r1 and r2. This suppresses generation of under spherical aberration, and thus enables reduction in the variations in the aberration caused during the tracking adjustment and macro photography.

As is clear from the foregoing description, it is possible according to the present invention to moderate the need for a high level of accuracy for both the macro photographic mechanism and the tracking adjusting mechanism, while reducing the size of the optical system. It is further possible to alleviate changes in the various aberrations caused during the tracking adjustment, thereby obtaining an excellent, sharp and vivid image definition.

While the present invention has been described with respect to what presently are considered to be the preferred embodiments, it is to be understood that the invention is not limited to the disclosed embodiments. To the contrary, the present invention is intended to cover various modifications and equivalent arrangements included with the spirit and scope of the appended claims. The following claims are to be accorded a broad interpretation, so as to encompass all such modifications and equivalent structures and functions.

What is claimed is:

1. A zoom lens comprising:
a front lens portion having a plurality of lens units which are separated from each other by spaces that are variable for zooming; and
a rear lens portion for introducing rays of light emitted from said front lens portion to an image surface, said rear lens portion consisting of a front relay group and a rear relay group, said rear relay group comprising a first movable lens group having a positive refractive power and a second movable lens group having a positive refractive power, wherein a lateral magnification $\beta1$ of said first movable lens group and a lateral magnification $\beta2$ of said second movable lens group satisfying the following conditions:

$$0.18 \leq (1-\beta1^2)\beta2^2 \leq 0.5$$

$$0.5 \leq (1-\beta2^2) \leq 0.82$$

and said first movable lens group is adapted to move along an optical axis for macro photography while said second movable lens group is adapted to independently move along the optical axis for tracking adjustment.

2. The zoom lens according to claim 1, wherein said first movable lens group comprises a cemented lens of two materials while said second movable lens group comprises a cemented lens of two materials and a positive lens.

3. The zoom lens according to claim 2, wherein said cemented lens in said second movable lens group has a concave cemented surface lens on the side thereof closer to an object and is of a negative refractive power, and wherein a difference $\Delta n$ in the refractive index between the two materials satisfies the condition expressed by $0.15 \leq \Delta n$.

4. The zoom lens according to claim 2, wherein a shape parameter X of said positive lens in said second movable lens group satisfies the condition expressed by $0 \leq X \leq 3$ when the shape parameter X is given by $$X = \frac{r2 + r1}{r2 - r1}$$

where r1 is the radius of curvature of the surface located closer to the object, and r2 is the radius of curvature of the surface located closer to the image.

5. A zoom lens comprising:

a front lens portion having a plurality of lens units which are separated from each other by spaces that are variable for zooming; and a rear lens portion for introducing rays of light emitted from said front lens portion to an image surface, said rear lens portion consisting of a front relay group and a rear relay group, said rear relay group comprising a first movable lens group having a positive refractive power and a second movable lens group having a positive refractive power, said first movable lens group further comprising a cemented lens of two materials and said second movable lens group further comprising a cemented lens of two materials and a positive lens, wherein said cemented lens in said second movable lens group has a concave cemented surface on the side thereof closer to an object, and is of a negative refractive power, wherein a difference $\Delta n$ in the refractive index between the two materials satisfies the condition expressed by $0.15 \leq \Delta n$.

6. A zoom lens comprising:

a front lens portion having a plurality of lens units which are separated from each other by spaces that are variable for zooming; and a rear lens portion for introducing rays of light emitted from said front lens portion to an image surface, said rear lens portion consisting of a front relay group and a rear relay group, said rear relay group comprising a first movable lens group having a positive refractive power and a second movable lens group having a positive refractive power, said first movable lens group further comprising a cemented lens of two materials and said second movable lens group comprising a cemented lens of two materials and a positive lens, wherein a shape parameter X of said positive lens in said second movable lens group satisfies the condition expressed by $0 \leq X \leq 3$ when the shape parameter X is given by $$X = \frac{r2 + r1}{r2 - r1}$$

where r1 is the radius of curvature of the surface located closer to the object, and r2 is the radius of curvature of the surface located closer to the image.

* * * * *

UNITED STATES PATENT AND TRADEMARK OFFICE
CERTIFICATE OF CORRECTION

PATENT NO. : 5,204,779
DATED : April 20, 1993
INVENTOR(S) : KAZUO NAKATA, ET AL.

It is certified that error appears in the above-identified patent and that said Letters Patent is hereby corrected as shown below:

Column 4:
  Line 6, "$G_M$" should read --$G_M$,--.
  Line 42, "$G_F$is" should read --$G_F$ is--.

Column 7:
  Example 1,   "$(1-\beta_1^2)\ \beta_{22} = 0.49512$
                $(1-\beta_{22})\ = 0.50361$" should read
              --$(1-\beta_1^2)\ \beta_2^2 = 0.49512$
                $(1-\beta_2^2)\ = 0.50361$--
  Example 2,   "$(1-\beta_1^2)\ \beta_{22} = 0.18238$
                $(1-\beta_{22})\ = 0.81635$" should read
              --$(1-\beta_1^2)\ \beta_2^2 = 0.18238$
                $(1-\beta_2^2)\ = 0.81635$--

Column 8:
  Line 67, "infinity" should read --infinity,--.

Column 9:
  Line 40, "infinity" should read --infinity,--.

Column 10:
  Line 35, "Gr" should read --$G_F$--.

Signed and Sealed this

Fifteenth Day of March, 1994

*Attest:*

BRUCE LEHMAN

*Attesting Officer*   Commissioner of Patents and Trademarks